United States Patent
Sharma et al.

(10) Patent No.: US 8,522,345 B2
(45) Date of Patent: *Aug. 27, 2013

(54) MANAGEMENT OF HIERARCHICAL REFERENCE DATA

(75) Inventors: Dinesh Sharma, Westwood, MA (US); Mark Goldsmith, Rowley, MA (US); Venkat Narsimha Karedla, Quincy, MA (US); Brian G. Salloway, Worcester, MA (US); Michael Murphy, Manchester, NH (US)

(73) Assignee: FMR LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/917,430

(22) Filed: Nov. 1, 2010

(65) Prior Publication Data

US 2011/0214065 A1 Sep. 1, 2011

Related U.S. Application Data

(63) Continuation of application No. 10/681,496, filed on Oct. 8, 2003, now Pat. No. 7,827,591.

(51) Int. Cl.
*G06F 11/00* (2006.01)

(52) U.S. Cl.
USPC .................................. 726/22; 709/205

(58) Field of Classification Search
USPC ........................................................... 726/22
See application file for complete search history.

(56) References Cited

U.S. PATENT DOCUMENTS

| | | | |
|---|---|---|---|
| 5,546,579 A | 8/1996 | Josten et al. | |
| 5,649,200 A * | 7/1997 | Leblang et al. | 717/122 |
| 5,867,110 A | 2/1999 | Naito et al. | |
| 5,999,942 A | 12/1999 | Talati | |
| 6,067,637 A * | 5/2000 | Auer et al. | 714/26 |
| 6,108,004 A * | 8/2000 | Medl | 715/804 |
| 6,233,609 B1 * | 5/2001 | Mittal | 709/219 |
| 6,240,414 B1 * | 5/2001 | Beizer et al. | 1/1 |
| 6,330,572 B1 * | 12/2001 | Sitka | 707/608 |
| 6,401,079 B1 * | 6/2002 | Kahn et al. | 705/30 |
| 6,704,873 B1 | 3/2004 | Underwood | |
| 7,062,532 B1 * | 6/2006 | Sweat et al. | 709/205 |
| 7,100,195 B1 | 8/2006 | Underwood | |
| 7,134,137 B2 | 11/2006 | Joshi et al. | |
| 7,185,192 B1 | 2/2007 | Kahn | |
| 7,219,304 B1 | 5/2007 | Kraenzel et al. | |
| 7,222,369 B2 | 5/2007 | Vering et al. | |
| 7,246,370 B2 | 7/2007 | Valente et al. | |

(Continued)

OTHER PUBLICATIONS

Hidenari Kiyomitsu, Atsunori Takeuchi, and Katsumi Tanaka. 2001. Activeweb: XML-based active rules for web view derivations and access control. Aust. Comput. Sci. Commun. 23, 6 (Jan. 2001), 31-39. DOI=10.1145/545617.545624 http://dx.doi.org/10.1145/545617.545624.*

(Continued)

*Primary Examiner* — Carl Colin
*Assistant Examiner* — S. Ali Zaidi
(74) *Attorney, Agent, or Firm* — Fish & Richardson P.C.

(57) ABSTRACT

There are methods and apparatus, including computer program products, for managing hierarchical reference data. There is a Web page for access by a user, where the Web page includes (i) data representing a hierarchy and (ii) rules defining modifications that are permitted to be made to data. The user is enabled to make a real-time modification to the data based on the rules.

40 Claims, 6 Drawing Sheets

(56) References Cited

U.S. PATENT DOCUMENTS

| | | | |
|---|---|---|---|
| 2001/0044840 A1 | 11/2001 | Carleton | |
| 2002/0091736 A1* | 7/2002 | Wall | 707/513 |
| 2002/0103737 A1* | 8/2002 | Briere | 705/36 |
| 2002/0103906 A1* | 8/2002 | Knight et al. | 709/225 |
| 2002/0120859 A1 | 8/2002 | Lipkin et al. | |
| 2004/0205039 A1 | 10/2004 | Bittner et al. | |
| 2011/0047123 A1* | 2/2011 | Herrera et al. | 706/59 |

OTHER PUBLICATIONS

Butler, J., Caudill, T., "ASP:NET Database Programming. Weekend Crash Course", Dec. 2001.*

Longhua Zhang, Gail-Joon Ahn, and Bei-Tseng Chu; "A Rule-Based Framework for Role-Based Delegation and Revocation"; ACM Transactions on Information and System Security, vol. 6, No. 3, Aug. 3003, pp. 404-441.

Macias, J.A.; Castells, P.; "Tailoring dynamic ontology-driven web documents by demonstration"; Jul. 10-23, 2002; 2002 IEEE; pp. 535-540.

Razza Solutions, "Metadata Hierarchies Dimensions: Simple Management Tools." www.razzasolutions.com. Austin, TX. (12 pages).

Prosecution History of U.S. Appl. No. 10/681,496.

* cited by examiner

MANAGEMENT OF HIERARCHICAL REFERENCE DATA

BACKGROUND

The present invention relates to data processing by a computing device, and more particularly to management of hierarchical reference data.

User interface programs facilitate the interaction between humans and machines by inviting and responding to interaction from a user. User interfaces come in many varieties, and are designed to work in concert with an application program. A common situation involving user interfaces is a network connection between a server and one or more clients. The client/server relationship is one in which a server provides services to other computer programs in the same or other computers, the client devices. Both the clients and the server typically have a network interface for accessing networks such as a local area network (LAN), a wide area network (WAN), or the Internet.

A common client device is a personal computer and a common user interface application for a network environment is a Web browser application program. The browser allows networked communication between the client device and a server using a data transfer protocol, e.g., the Hypertext Transfer Protocol (HTTP), to exchange files, images, or programs. HTTP is a request/response type protocol that specifies how the client and the server communicate with each other. The server may receive a request from the browser using HTTP, respond to it, and then close the connection. HTTP is a stateless protocol, meaning that each time a client requests a Web page, the server will respond to the request independently of any previous requests by the client, and without recording the request.

The contents of a file transmitted from the server and intended for display in a browser on the client device may be marked up with Hypertext Markup Language (HTML) code or Extensible Markup Language (XML). HTML is a language that is used to describe the structure of a document, such as a Web page. Browsers interpret the HTML code to determine how to display the information contained in the page. A user may request a Web page from a server by clicking a hyperlink or entering a Uniform Resource Locator (URL) string. A URL is the address of a file that may be accessed on the Internet. The address identifies the Web server it is stored on and the directory in which the file is located. When the server receiving the URL request finds the sought Web page, the server sends the page to the browser so that the browser can process the page, for example, generate a display based on the contents of the Web page.

SUMMARY OF THE INVENTION

The description describes methods and apparatus, including computer program products, for management of hierarchical reference data. In one aspect there is a method for managing hierarchical reference data. The method includes making available a Web page for access by a user, where the Web page includes (i) data representing a hierarchy and (ii) rules defining modifications that are permitted to be made to data. The method also includes enabling a user to make a real-time modification to the data based on the rules.

In another aspect there is a method for managing hierarchical reference data. The method includes making available a Web page for access by a user, where the Web page includes (i) data representing a hierarchy and (ii) rules defining modifications that are permitted to be made to data. The method also includes enabling a user to make a modification to the data based on real-time enforcement of the rules.

Either of the above methods can have one or more of the following features. The method can also include performing local rule enforcement at a client. The method can also include comparing a first data element of a first member of the hierarchy with a second data element of a second member in the hierarchy to identify a possible conflict between the first data element and the second data element. The possible conflict can include the first data element being identical to the second data element. The first and second data elements can include an identifier. The identifier can include a member code and/or a member description.

The method can also include monitoring the real-time modification to the data. The method can also include generating an audit report including information corresponding to the real-time modification. The method can also include monitoring other modifications occurring at other Web pages. The method can also include performing an application server rule enforcement. The method can also include preventing the real-time modification if the real-time modification conflicts with the other modifications occurring at the other Web pages. The method can also include performing a master data rule enforcement. The method can also include preventing the real-time modification if the real-time modification conflicts with an entry in stored master data.

The method can also include searching for a conflict and storing the modification if no conflict is found. The data representing the hierarchy can be a first set of data representing a first hierarchy, and the method can also include making available a second set of data representing a second hierarchy. The method can also include enabling the user to move a portion of the second set of data to the first set of data. The method can also include preventing a modification to the moved portion of the second set of data. The method can also include maintaining an original hierarchical relationship of the moved portion of the second set of data in the first hierarchy. The method can also include automatically updating the moved portion of the second set of data in the first hierarchy when there is a change to a portion of the second set of data in the second hierarchy corresponding to the moved portion of the second set of data in the first hierarchy.

The method can also include enabling a user to establish an arrangement of a portion of the hierarchy. The method can also include storing the arrangement of a portion of the hierarchy. One of the rules can include a conflict check. One of the rules can include preventing the modification if the user does not have permission to make the modification. The method can also include establishing permission using an ownership attribute. The method can also include generating a report based on transactional data and the data representing the hierarchy. The method can also include making some portions of the transactional data viewable and other portions of the transactional data summarized based on the data representing the hierarchy. The method can also include enabling the user to modify the data representing the hierarchy to indicate viewable and non-viewable portions. The method can also include notifying a subscriber of the modification. The hierarchy can include a node tree.

In another aspect, there is a system including a computing device. The computing device processes a Web page that includes (i) data representing a hierarchy and (ii) rules enabling a user to make a real-time modification to the data based on the rules. The system can also include one or more of the following features. The system can also include a client, which includes the computing device. The system can also include a rule enforcement module that enables a user to make a real-time modification to the data based on the rules. The system can also include a server, which includes the computing device. The system can also include a storage device storing the data representing the hierarchy. The system can also include a database including the data representing a hierarchy. The system can also include a network wherein the Web page is transmitted using the network.

In another aspect, there is an article that includes machine-readable medium storing instructions operable to cause one or more machines to perform operations that include any combination of the methods described above.

There can be implementations that realize one or more of the following advantages. Providing some run-time management of user interfaces on client independent of the software application on the server. There is no need to redisplay and reload all of the data when a save is made to a hierarchy. A reorganization of a company hierarchy can be accomplished by a few drag and drop moves. The user interface enables this drag and drop in a tree-like view in a Web environment. The rule enforcement module can be platform/device-independent, allowing standard browsers on different client devices to incorporate the techniques described herein. There is an ease of deployment of software applications via existing Internet infrastructure while providing greater features than those of standard browsers. In other words, no need to deploy a separate application to each client individually. Extensive audit lists can be generated. Users can subscribe to certain hierarchies, or portions thereof, and receive notice of any modifications corresponding to those certain hierarchies, or portions thereof. A user can modify the hierarchical data to create a definition of summarized views when the hierarchical data is combined with transactional data. One implementation of the invention provides all of the above advantages.

The details of one or more examples are set forth in the accompanying drawings and the description below. Further features, aspects, and advantages of the invention will become apparent from the description, the drawings, and the claims.

DETAILED DESCRIPTION

Figure 1:
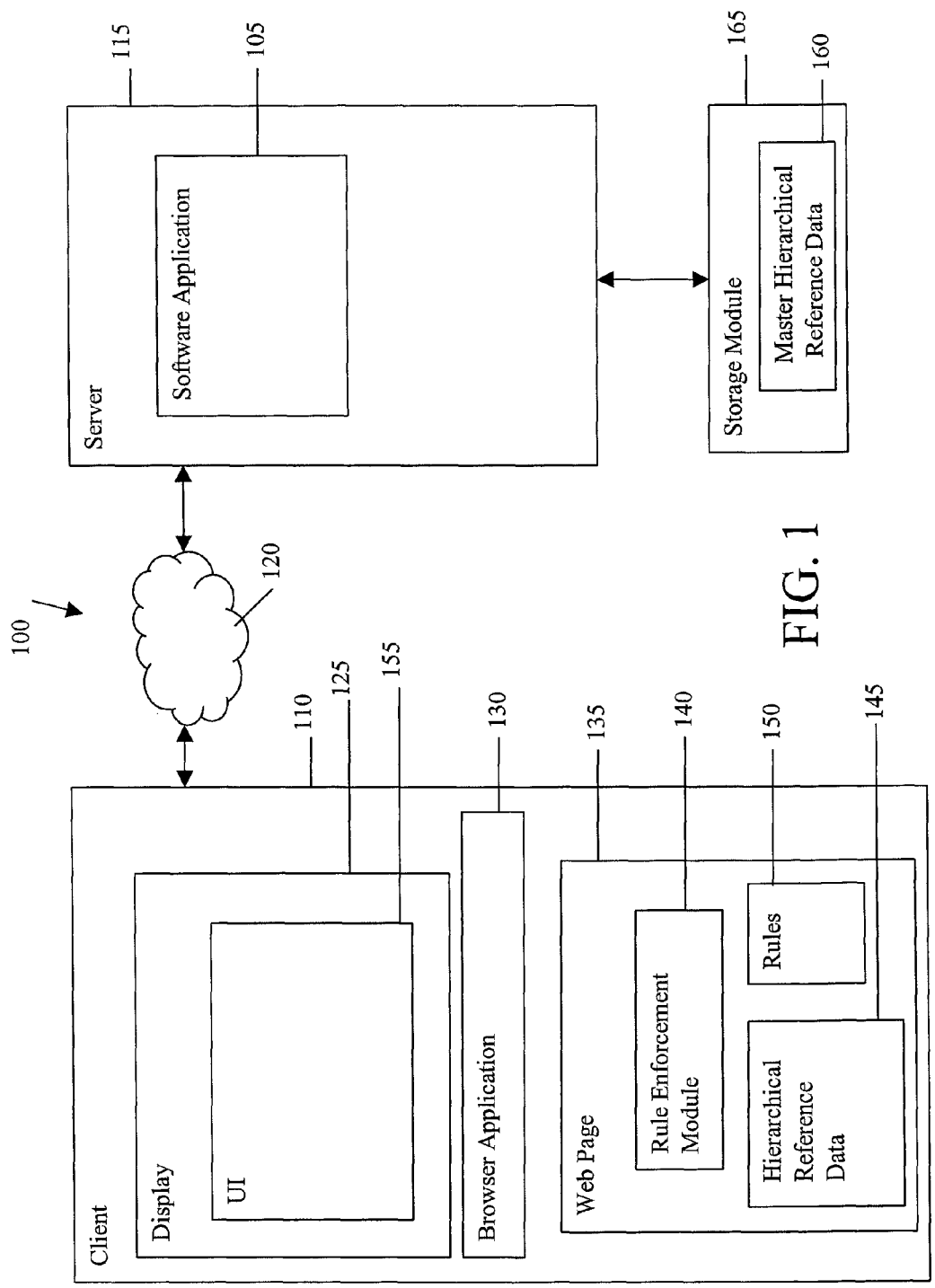
FIG. 1 is a block diagram of a system to manage a hierarchy using a network.

As shown in FIG. 1, a system 100 allows a user to interact with a software application 105 to manage hierarchical reference data used by other systems in an organization, such as a company. This hierarchical reference data can include, for example, people of the company, cost centers of the company, products of the company, and departments of the company. System 100 includes a client 110 and an application server 115. Client 110 communicates with server 115 using network 120, for example, the Internet. Client 110 includes a display 125 and a browser application 130. Browser 130 communicates with server 115 using network 120 to receive one or more Web pages transmitted from server 115. When the user wants to interact with application 105, the user initiates interaction, for example, by entering a URL using browser 130.

As illustrated, in response to the browser request, server 115 provides a web page 135 to manage hierarchical reference data that includes a rule enforcement module 140, hierarchical reference data 145, and a set of rules 150. Browser 130 processes the contents of Web page 135 and based on the contents, renders a user interface 155 through which a user interacts with hierarchical reference data 145 and application 105 executing on server 115. User interface 155 enables the user to view and manipulate hierarchical reference data 145 using rules 150, which define how a user can modify hierarchical reference data 145. Rule enforcement module 140 represents executable code to effect manipulation of hierarchical reference data 145 and rule checking Rule enforcement module 140 is implemented using, for example, JavaScript, VBScript, and/or remote scripting. The code implementing rule enforcement module 140 (or portions thereof) can be, for example, embedded directly in received Web page 135 and/or stored as a separate file that is referenced in received Web page 135 and downloaded by browser 130 when browser 130 processes received Web page 135. Although Web page 135 shows rule enforcement module 140 and rules 150 as two separate entities, they can be combined and implemented as a single entity. For example, in some implementations Web page 135 includes a data portion, a layout information portion, and a logic portion. The data portion includes, for example, hierarchical reference data 145. The layout information portion includes, for example, the look and feel of UI 155, its controls, and how the data of the data portion is displayed. The logic portion includes, for example, scripting code (e.g., JavaScript) to control the user interaction with UI 155. In such implementations, rule enforcement module 140 and rules 150 are combined and included in the logic portion of Web page 135.

Application 105 generates, maintains, retrieves, and/or manipulates master hierarchical reference data 160 on the server-side of network 120. Master hierarchical reference data 160 is stored in a storage module 165. For example, storage module 165 can include a database that stores master hierarchal reference data 160. Application 105 also tracks changes being made to hierarchical reference data 145 at client 110. Tracking remote changes allows application 105 to transmit those changes to other client devices that are displaying the same hierarchical reference data. Tracking changes also allows application 105 to perform real-time database rule enforcement based on master hierarchical reference data 160 (e.g., ensure that key fields with unique identifiers are not duplicated).

Rule enforcement module 140 provides three types of rule enforcement. The first type is local rule enforcement. Rule enforcement module 140 performs this type of rule enforcement exclusively at client 110 and independent of application 105 and storage module 165. That is, rule enforcement module 140 does not need to transmit data over network 120 to perform local rule enforcement. The second type of enforcement is application server rule enforcement. Rule enforcement module 140 performs this type of rule enforcement by sending the appropriate calls to server 115 to enforce rules involving multiple users when modified data has not yet been saved to master hierarchical reference data 160. The third type of enforcement is master data rule enforcement. Rule enforcement module 140 performs this type of rule enforcement by sending the appropriate calls to server 115 to enforce rules involving master hierarchical reference data 160.

Local rule enforcement is real-time hierarchy data management on client 110 when the user, using UI 155, changes hierarchical reference data 145 associated with received Web page 135. To perform hierarchy management at client 110, rule enforcement module 140 tracks user modifications to hierarchical reference data 145. When rule enforcement module 140 determines there has been a change to the data (e.g., detection of a one or more browser events to the displayed hierarchy data in UI 155), rule enforcement module 140 compares the requested change to rules 150 to determine whether the change violates any rules 150. If the change does not violate any rules 150, rule enforcement module 140 modifies hierarchal reference data 145.

For example, to copy a node from one hierarchy to another, a user clicks on a node of a displayed hierarchy and drags that node, using a mouse, from its current parent node to a new parent node. As soon as rule enforcement module 140 becomes aware of the new parent node (e.g., the new parent node is selected as the cursor touches the new parent, for example, on a mouse over event) rule enforcement module 140 checks the move with rules 150. If the move is allowed by rules 150, when the user selects the new parent node (e.g., releases the mouse button), the selected node is copied to the new parent node. If the move is not allowed by rules 150, when the user releases the dragged portion (e.g., releases the mouse button), the selected node does not copy over to the new parent node, but simply remains with the previous parent node.

For the above modification and for other modifications, rule enforcement module 140 can perform the application server rule enforcement and the master data rule enforcement in addition to the local rule enforcement. Rule enforcement module 140 uses rules 150 to determine which combination of the three rule enforcement types to invoke. For example, rules 150 can state that when a unique identifier (e.g., member code) is modified, rule enforcement module 140 performs all three of the types of rule enforcement. For the local rule enforcement, rule enforcement module 140 verifies that the unique identifier does not exist in hierarchical reference data 145 at client 110. For the application server rule enforcement, rule enforcement module 140 sends the requested change to application 105 over network 120 using a proper call to cause program 105 to check the unique identifier against changes application 105 is tracking at other clients that have not been saved to master hierarchical reference data 160. For the master data rule enforcement, rule enforcement module 140 also sends the requested change to application 105 over network 120 using a proper call to cause program 105 to check the unique identifier against master hierarchical data 160 to determine whether there is a database conflict with master hierarchical reference data 160. In some implementations, there rule enforcement module 140 uses a single call to invoke both the application server rule enforcement and the master data rule enforcement for the modification.

Rule enforcement module 140 performs the remote rule enforcement (i.e., server rule enforcement and master data rule enforcement) without causing a refresh of data (i.e., reload Web page 135). To accomplish this, rule enforcement module 140 uses a remote scripting technique. Remote scripting enables client 110 to access code on the server side of network 120 without refreshing Web page 135. The remote scripting technique enables a static HTML Web page (e.g., page 135) to behave as a traditional client-server application. The remote scripting technique generates an interface between client 110 and server 115 using a hidden applet on Web page 135. The applet, through client side scripting, (e.g., VBScript or JavaScript) makes a URL connection to a server side active server page (ASP) (e.g., generated by application 105), which can connect to backend data storage (e.g., storage module 165) or perform middle tier business logic.

The remote scripting technique performs communication between client 110 and server 115 synchronously or asynchronously. When communicating asynchronously, the remote scripting technique specifies a callback function along with the method call to server 115. This callback function is invoked on return of the asynchronous method. Asynchronous communication is advantageous for longer running backend validations for example, which allow the user to make a request and continue working on the page without having to wait for the results. Synchronous methods block until the call returns, which is usually not an issue for shorter method calls. Browsers manufactured by Microsoft Corporation of Redmond, Wash. and Netscape Communications Corporation of Mountain View, Calif. support the remote scripting technique. Some versions of the browser by Netscape Communications Corporation use Sun Microsystems' Java plug-in, which requires applets making socket connections to be signed.

Figure 2:
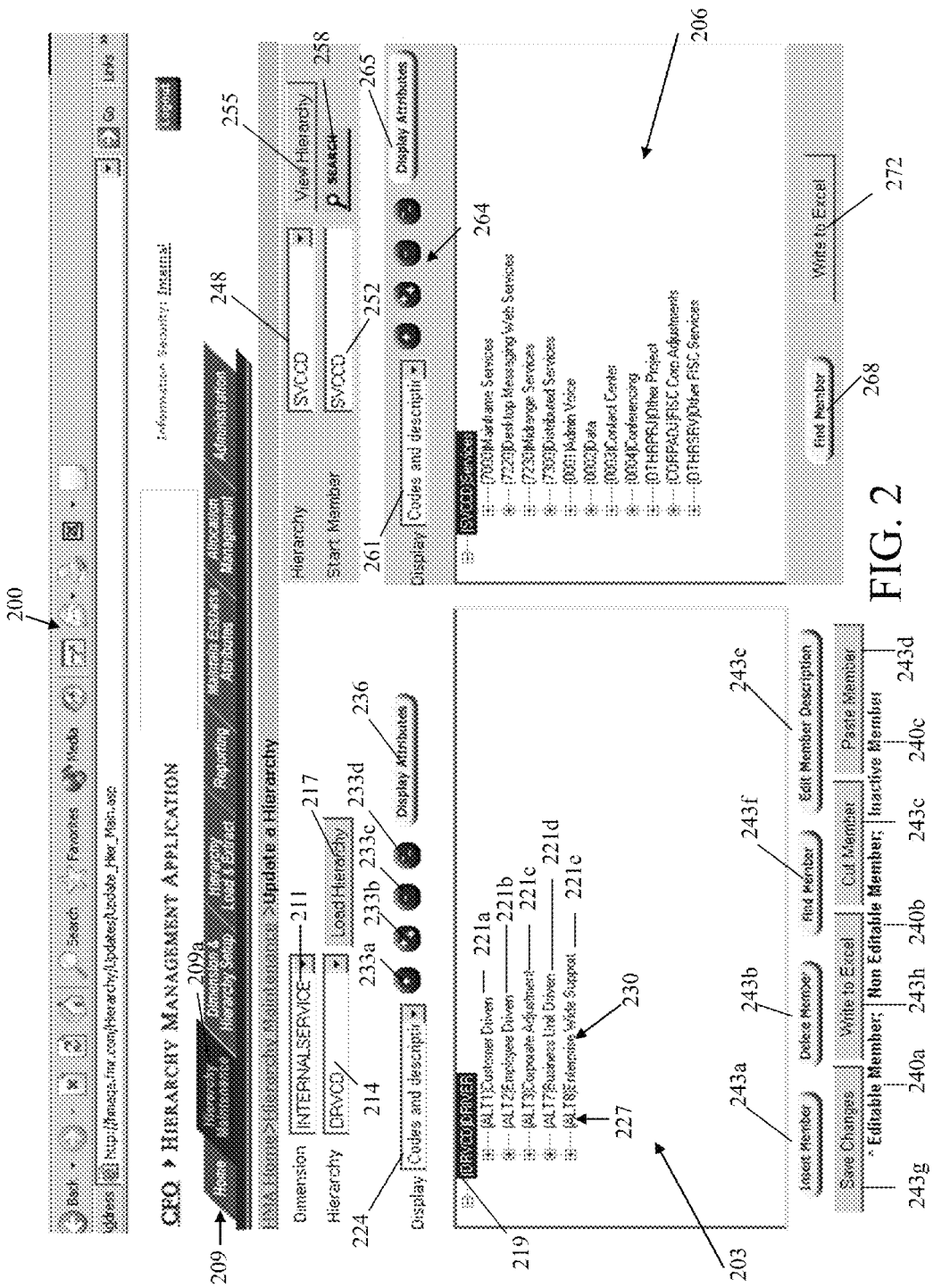
FIG. 2 is a screenshot of a user interface to manage hierarchical reference data.

FIG. 2 illustrates a screenshot 200 that provides an example of UI 155. Screenshot 200 includes a first area 203 and a second area 206, both of which display hierarchical reference data. First area 203 also enables the user to modify the hierarchical reference data. Screenshot 200 also includes a row of tabs 209 that enables a user to select from multiple functions. Tab 209*a*, entitled "Hierarchy Maintenance", enables the user to select and modify hierarchical reference data. The user chooses a dimension using pull down box 211. A dimension is an overall wrapper associated with a particular group of reference information for a company. For example, one dimension might be internal services, which holds all of the services offered by a company and their hierarchies (e.g., groups of services arranged hierarchically). As illustrated in screenshot 200, the user has selected the dimension "INTERNALSERVICE" in box 211. The user chooses a root node of display area 203 using pull down box 214. As illustrated in screenshot 200, the user has selected the root node "DRVCD" in box 214. The user clicks on a "Load Hierarchy" button 217 and the Web browser (e.g., browser 130) displaying screenshot 200 requests a Web page containing the selected hierarchical reference data.

Referring to area 203, the hierarchical reference data includes a parent node 219 and five children nodes 221*a*, 221*b*, 221*c*, 221*d*, and 221*e*, generally referred to as 221. The nodes of the hierarchical reference data are also referred to as members. Pull down box 224 enables the user to select how the members of the hierarchical reference data are displayed. As illustrated, because the selection made in box 224 is "Codes and descriptions", members 219 and 221 are displayed in area 203 using member codes 227 (e.g., ALT1) and member descriptions 230 (e.g., Customer Driven). The arrangement of children nodes 221 is in alphanumeric order, using the member codes (e.g., 227). This may be a default arrangement. The user can modify this arrangement, for example by moving member 221*e* to the top of the list before member 221*a*. If such an arrangement is allowable (e.g., does not violate the rules), the master hierarchical data (e.g., 160) is updated with this new arrangement and every time this hierarchy, or a hierarchy with a copied parent node 219, is subsequently displayed, children nodes 221 are arranged with member 221*e* on the top.

Expansion and contraction buttons 233 enable the user to select what hierarchical levels are displayed in area 203. For example, button 233*a* expands (e.g., displays the children nodes) of the currently highlighted node. As illustrated, with node 219 highlighted, clicking button 233*a* (e.g., moving a cursor over the button using a mouse and clicking a mouse button) causes the children nodes 221 to be displayed. Button 233b expands all of the nodes from root node 219 to the nodes at the lowest hierarchical level of the hierarchical reference data. Button 233c contracts (e.g., remove from display) the children of the highlighted node. With node 219 highlighted, pressing button 233c causes the children nodes 221 to be removed from display in area 203. Button 233d contracts all of the children nodes, leaving only the parent root node (e.g., 219) displayed. The user can also effect expansion and contraction by clicking on the boxes with the "−" (contract) or "+" (expand) symbols that precede the member codes 227. In one example, area 203 is generated using TreeView controls available if client 110 employs a MICROSOFT® WINDOWS® operating system, manufactured by Microsoft Corporation of Redmond, Wash.

The user can display the attributes (and their current values) of members 219 and 221 of the hierarchical reference data by clicking on a "Display Attributes" button 236. For example, a member that is a cost center type can display the attribute cost center manager, with the value being the person or group who manages that member, the attribute physical location, with the value being the state in which that member is located, the attribute purpose of cost center, with the value being the type of expenses for that member, and/or the attribute status of member, with the value being active or inactive. Visual indicators 240a, 240b, and 240c indicate to a user whether, based on rules 150, a member of the hierarchical reference data displayed in area 203 is editable (240a), non-editable (240b) or inactive (240c). An inactive member is a member to which other applications can no longer post transactions, but is still maintained in a hierarchy for historical data. To accomplish visual indication, screenshot 200 can display, for example, each of visual indicators 240a, 240b, and 240c using different colors and then display the members 219 and 211 in a corresponding color.

To enable a user to modify the hierarchical reference data, screenshot 200 includes buttons 243a, 243b, 243c, 243d, 243e, 243f, 243g, and 243h. Button 243a enables a user to insert a new member as a child member under a currently highlighted member. Button 243b enables a user to delete a currently highlighted member. Button 243c enables a user to cut (i.e., delete) a currently highlighted member and button 243d enables a user to paste (i.e., insert) that cut member as a child member under a currently highlighted member. Button 243e enables a user to edit the member description (e.g., 230) of a currently highlighted member. Button 243f enables a user to search for a member using, for example, a keyword, a member code (e.g., 227), and/or a member description (e.g., 230). In one example, screenshot 200 displays the one or more members that match the entered search term(s) in area 203 by expanding and contracting the hierarchical reference data as needed. Button 243g enables a user to update the master hierarchical reference data (e.g., data 160 in storage module 165) to incorporate the modifications that the user made. Button 243h enables a user to export the hierarchical reference data of area 203 to another application, for example, as illustrated to a MICROSOFT® Excel spreadsheet application manufactured by Microsoft Corporation of Redmond, Wash.

As illustrated, screenshot 200 also has area 206 to display a second set of hierarchical reference data. The user chooses a hierarchy to display using pull down box 248. Similar to box 214, box 248 includes all of the hierarchies of the dimension "INTERNALSERVICE" in box 211. The user chooses a root node of display area 206 using text entry box 252. As illustrated in screenshot 200, the user has selected the root node "SVCCD" in box 252. The user clicks on a "View Hierarchy" button 255 and the Web browser (e.g., browser 130) displaying screenshot 200 displays the selected hierarchical reference data in area 206. If the user does not know the member description for the desired root node, button 258 enables the user to search the member descriptions for the members of the hierarchy selected in box 248.

Similar to area 203, area 206 also has a pull down box 261 that enables the user to select how the members of the hierarchical reference data are displayed, expansion and contraction buttons 264, and a display attributes button 265. Area 206 also has button 268 that enables a user to search for a particular member and button 272 that enables a user to export the hierarchical reference data of area 206 to another spreadsheet application. Although not shown, in other examples, area 206 can also include edit buttons similar to buttons 243a-h of area 203 to enable a user to modify the hierarchical reference data displayed in area 206. By having two hierarchies displayed, a user can advantageously use one hierarchy to modify a second hierarchy. For example, a user can select one of the members displayed in area 206 and drag that member into the hierarchical reference data displayed in area 203.

When a member is copied from area 206 to area 203, the attributes of that member and any of its children nodes are also copied. This ensures that the particular member copied remains consistent (i.e., keeps the same attributes and children members) throughout any hierarchies of the company. To further ensure consistency, as described in more detail below, some implementations include a rule that does not allow a user to modify the copied member (e.g., change its attributes or children), but only allows changes to the original, originating member. In such examples, application 105 tracks the hierarchies to which the member is copied, so that when a user changes the originating member, application 105 updates all copies of that member accordingly, keeping all copies of that member consistent with the original. For example, if a user copies a member from a first hierarchy to a second hierarchy, application 105 tracks that copy. When a user subsequently modifies the originating member in the first hierarchy, for example adds a new child member, application 105 automatically modifies the second hierarchy, adding the new child member to the copied member in the second hierarchy. When a user subsequently displays the second hierarchy, the new child member is displayed.

Figure 3:
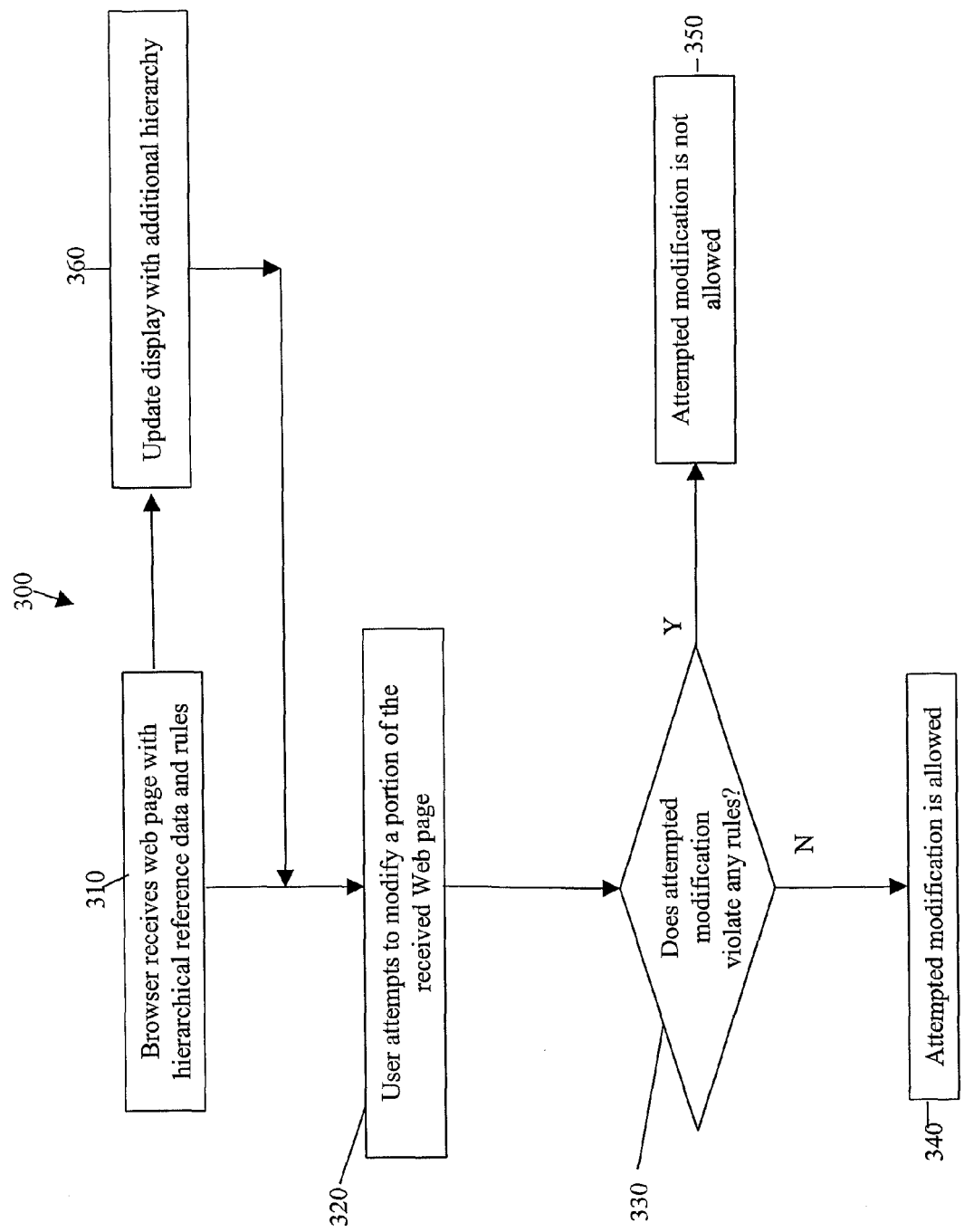
FIG. 3 is a block diagram of a process to manage a hierarchy.

FIG. 3 illustrates an example process 300 for updating a hierarchy. A user, using browser application 130, requests and receives 310 a Web page from server 115. This Web page includes a hierarchy and rules about modifying the hierarchy. The display of the Web page can be, for example, as illustrated by screenshot 200. If the user desires to make a modification to a single hierarchy, the user attempts 320 to modify a member of the hierarchy displayed on the Web page. Rule enforcement module 140 compares the attempted modification to the rules to determine 330 whether the attempted modification violates any rules. As described above, this rule validation can include any combination of local rules, application server rules, and/or database rules. For example, two rules may be that the user may update a particular member of the hierarchy if that user possess the necessary permission (e.g., is listed as an owner of that member) and the member is not a member copied from another hierarchy. If rule enforcement module 140 determines 330 that the attempted modification does not violate any rules, rule enforcement module 140 allows 340 the modification. If rule enforcement module 140 determines 330 that the attempted modification does violate a rule, then the modification is not allowed 350. In some examples, the user may be notified that the attempted modification is not allowed and a reason for the denial may be displayed.

In some cases, a user may desire to modify a hierarchy by dragging one or more members from a second hierarchy (e.g., dragging a member from area 206 to area 203). In this situation, process 300 updates 360 the display with data from the second hierarchy and any new rules associated with the new hierarchy. In one example, all of the hierarchies associated with a dimension (e.g., INTERNALSERVICE dimension indicated in box 211 of screenshot 200) are transmitted when browser 130 receives 310 the Web page. In such an example, all of the data and rules associated with any hierarchies of the dimension are already included in the Web page and no server round trips are needed to display the additional data. In another example, upon a request for the additional hierarchy, server 115 generates another Web page that includes the first hierarchy currently displayed and the second desired hierarchy. When browser 130 receives 310 the new Web page, browser 130 generates 360 a new UI 155 based on the new Web page, using known techniques to prevent flickering as much as possible. In yet another example, a document object model (DOM) is employed so that portions of the displayed Web page can be changed dynamically.

As described above, when a user attempts 320 to modify any of the hierarchies, rule enforcement module 140 determines 330 whether the attempted modification violates any rules. In the case of multiple hierarchies, UI 115 can allow the user to drag a member of one hierarchy to another hierarchy. This modification may require additional rules. For example, a user may only be able to drag nodes over which he has control, but no nodes superior to those. Further, another rule may require that when a member of a hierarchy is copied from one hierarchy to another, that portion can only be modified in the original hierarchy from which that portion came. For example, in the first, original hierarchy, the portion corresponds to an indicator (e.g., 240a) indicating that the members of that portion are editable. In any other hierarchies to which the portion is copied, the portion corresponds to an indicator (e.g., 240b) indicating that the members of that portion are not editable.

Figure 4:
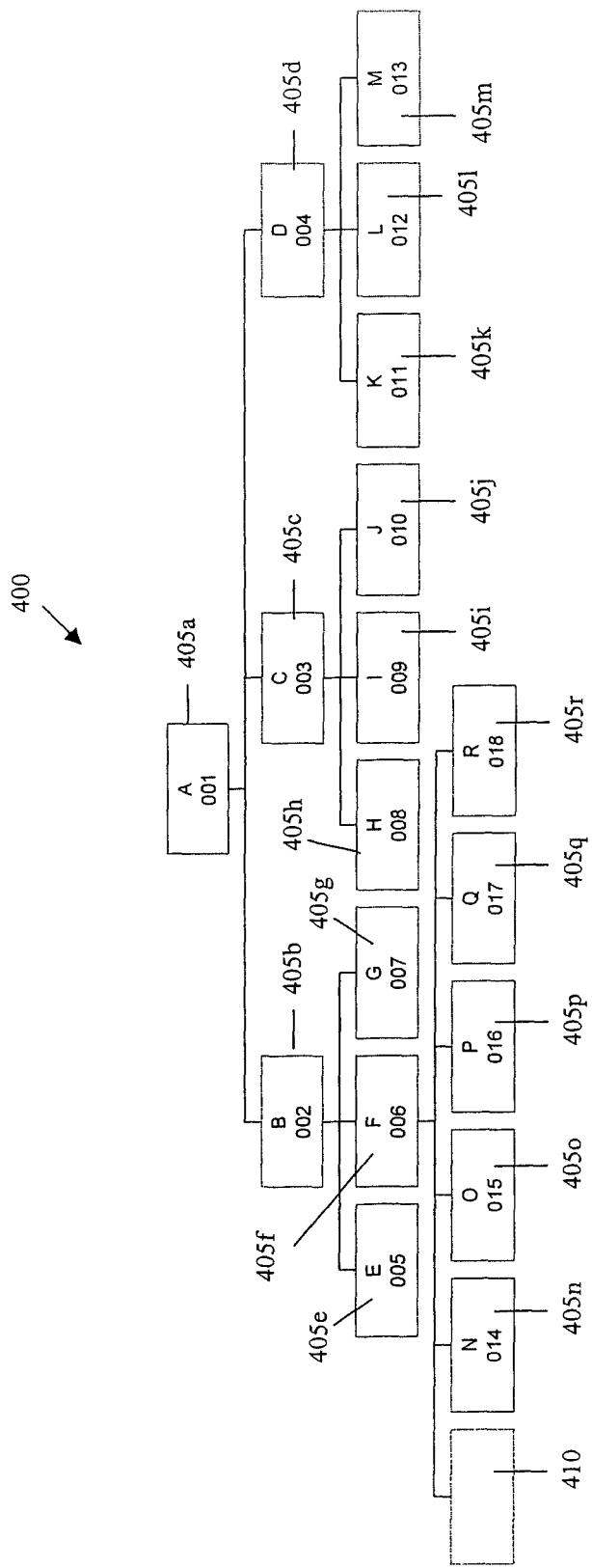
FIG. 4 is a block diagram of a hierarchy.

FIG. 4 shows an example hierarchy 400 that includes members 405a-r that represent cost centers of a company. As illustrated, members 405a-r include a member code that is a three digit number, which could represent, for example, an cost center number. Members 405a-r also include a member description that is a letter, which could represent, for example, a name for the cost center. As an illustrative example, this hierarchy can be part of hierarchical reference data 145 of received Web page 135 and the user requesting hierarchy 400 can be listed as an owner of member 405f (e.g., the userid of the user is a value for the owner attribute of member 405f). The system can determine that the user is the owner of member 405f, for example, by using the user credentials (e.g., userid) during an authentication process and comparing that to the owner attribute value of member 405f to verify there is a match.

For one example modification, the user desires to add a new member 410 to hierarchy 400 representing a new subordinate cost center. The rules associated with hierarchy 400 govern the adding a member to hierarchy 400. For example, a rule can include a restriction that a new member cannot have a member description (e.g., cost center name) and/or member code (e.g., cost center number) that conflicts with (e.g., is identical to) another member in hierarchy 400. For this example, rule enforcement module 140 does not allow new member 410 to have a member code of 011 or a member description of "M" because both are already used in hierarchy 400 by members 405k and 405m, respectively, and such use would cause a conflict.

To avoid a conflict, the user enters a member code of 019 and a member description of "S" for new member 410. Rule enforcement module 140 analyzes these new entries using rules 150 (e.g., no conflict with other member codes or descriptions of the hierarchy) in real-time. That is, upon entering the data for new member 410 (e.g., clicking a submit button, hitting enter key, and the like), compares the entered member code and description with all of the member codes and descriptions of hierarchy 400. Because in this example Web page 135 includes all of hierarchy 400, rule enforcement module 140 only has to do a local rule enforcement on client 110 to verify there is no conflict with any members 405a-r in hierarchy 400.

As described above, these conflict checks are performed in real-time (e.g., as the user is attempting to effect the modification) so if there is a conflict, rule enforcement module 140 does not display the new member and instead generates an error message, for example, stating that the member code/description conflicts with another member code/description in the hierarchy. If there are no conflicts, new member 410 is displayed in hierarchy 400. As described above, the system saves the arrangement of the members as modified by the user. So in this example, where new member 410 precedes member 405n, that arrangement would be saved and presented to any subsequent requesters.

The rule can be broader than a conflict with hierarchy 400. The rule can state that there can be no conflicting member codes or descriptions in a dimension. Rule enforcement module 140 can verify in real-time that the entered member code and member description for new member 410 does not conflict with any other members in the dimension. In an example where the received Web page includes all of the hierarchies of a dimension, hierarchy 400 being only one of those hierarchies, rule enforcement module 140 can verify without making any calls to server 115.

The rule can be broader than a conflict within a dimension. The rule can state that there can be no conflicting member codes or descriptions in all of the master hierarchical reference data 160 in storage module 165 (e.g., within a database). Rule enforcement module 140 can verify in real-time that the entered member code and member description for new member 410 does not conflict with any other members in master hierarchical reference data 160 by sending a proper call to application 105 (e.g., perform the application server rule enforcement and the master data rule enforcement described above). After performing the conflict check, application 105 returns an answer to rule enforcement module 140 and rule enforcement module 140 allows the modification or generates an error message based on the answer. This can be done seemingly instantaneously, depending on the latencies of network 120.

Another example rule can govern the movement of members within the hierarchy. For example, the user, who is the owner of member 405f, may desire to move superior parent member 405b to be a subordinate child member of member 405f. The rule can state that an owner of a member of hierarchy 400 may only move the members 405 of hierarchy 400 that are subordinate to the members for which the user is the owner. Under this rule, rule enforcement module 140 allows the owner of member 405f to rearrange hierarchy 400 such that member 405p can be a subordinate child to member 405q and therefore located under member 405 on hierarchy 400. This rule would not, however, allow the owner of member 405f to move member 405b.

Another rule can limit any modification of a member to the owner of that member. In one example, the owner of a node is identified in an attribute of that member. For example, in hierarchy 400, the user is the owner of member 405f. This example rule states that only the owner of a member can modify a member, for example, change the member description or add new child nodes. Further, the owner of a node can be determined through inheritance. For example, the user is also the owner of children members 405n-r because no other owners are defined for members 405n-r and members 405n-r are children of member 405f for which ownership is defined. In another example, a second user is the defined owner for member 405a and the first user is the defined owner for member 405f. Through inheritance, the second user can modify (e.g., change the member description) member 405b, which does not have a defined owner, but not member 405f, which has a different defined owner (i.e., the first user). However, as described above, the rule for moving members, if combined with this rule, may still allow the second user to move member 405b and all of its subordinate members (405e-g and 405n-r), for example, to place them subordinate to member 405c, even though the second user cannot modify some of those children members (e.g., 405f and 405n-r) due to ownership constraints.

As described above, another rule can prohibit any modification to members that are copied, restricting modification only to the original, originating members. For an illustrative example, let member 405c be a copied member from another hierarchy. In the originating hierarchy, member 405c has children members 405h-j, so the copied member also includes children members 405h-j. If the user attempts to modify member 405c, rule enforcement module 140 prevents such modification because member 405c is a copied member, not the originating member. The user has to request the originating hierarchy to make the modifications. As described above, application 105 tracks all copied members and any changes to the originating member. If the originating member is changed to add another child member, then application 105 also adds a copy of that child to the copied member 405c in the master data 160 so that a subsequent display of hierarchy 400 also includes a copy of that new child member added to the originating member. In some examples, this copy rule is combined with the ownership rule described above. In these examples, a user cannot modify a member unless the user is the owner of that member and the member is an originating member, not a copied member.

Figure 5:
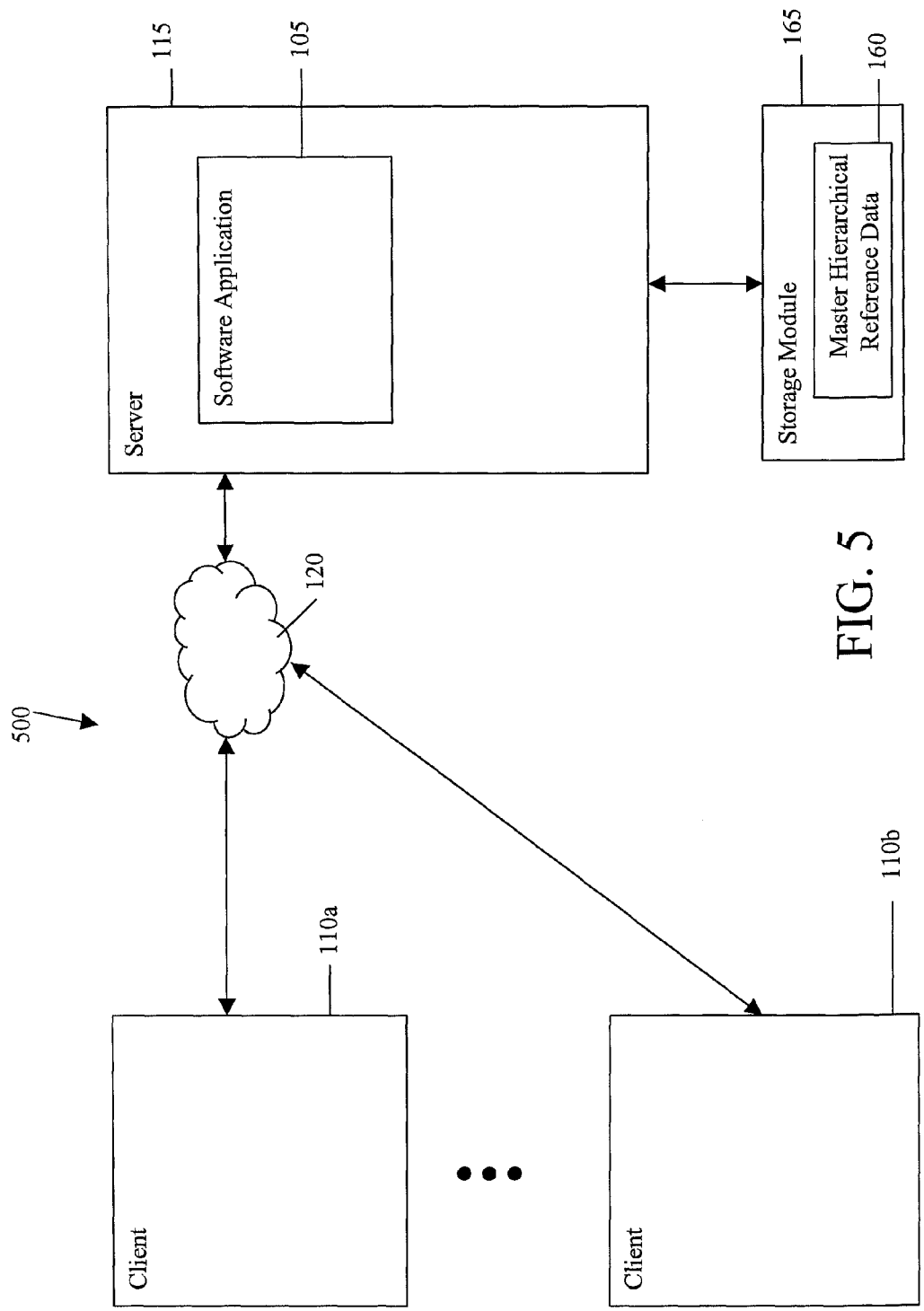
FIG. 5 is a block diagram of a system to manage a hierarchy by different clients using a network.

FIG. 5 illustrates a system 500 that includes a plurality of n clients (e.g., 110a to 110b) that communicate with server 115 using network 120. Client 110a and client 110b may each request hierarchical reference data form the master hierarchical reference data 160. Application 105 tracks, for example, what hierarchies are being updated, who is doing the updating, and what new member codes and/or descriptions are being created. In one example, rule enforcement module 140 transmits each modification, and any other information application 105 is collecting, to application 105, even though the user has not saved (e.g., pressed button 243g of screenshot 200) those modifications to master hierarchical reference data 160. By tracking this data on a real-time basis, application 105 can provide several additional features for managing hierarchical reference data. One feature application 105 provides is an extensive audit list of modifications. If someone in the company generates a report that combines transactional data with the hierarchical reference data, and there is a mismatch, that person can use the audit report to find out who modified the particular members presenting the problem and when they did so.

Another feature application 105 provides is a subscription service. The subscription service allows any user to subscribe to changes for one or more particular members, whether or not that user is an owner of the member. Application 105 notifies the subscriber when there is a change to the member corresponding to that subscription. The subscription also or alternatively can correspond to a different level, such as to a particular hierarchy or a particular dimension. The subscriber can select the channel of notification, for example, by providing an email address to receive notifications about changes via email.

Another feature application 105 provides is the use, by client 110b, of modifications made at client 110a but not yet saved to master hierarchical data 160. For example, a rule may state that a member description has to be unique within a hierarchy, but can be repeated within a dimension. The user of client 110a makes a modification, defining a new member description as SDE, which stands for software development engineering. Because application 105 tracks this, the user at client 110b can use this newly defined description also.

Another service that application 105 provides is enabling a user to define a summarized view of a report that combines a hierarchical reference data 145 with transactional data stored by the company on another database. A summarized view is a restrictive view that allows the reader of a report to only view a portion of the members included in hierarchical reference data 145. A summarized view also presents summary information about the members of hierarchical reference data 145 that the user is not allowed to view. In other words certain members of hierarchical reference data 145 are displayed and other members are summarized. The non-viewable members are summarized at a viewable hierarchically higher member (e.g., parent, grandparent, and the like).

Figure 6:
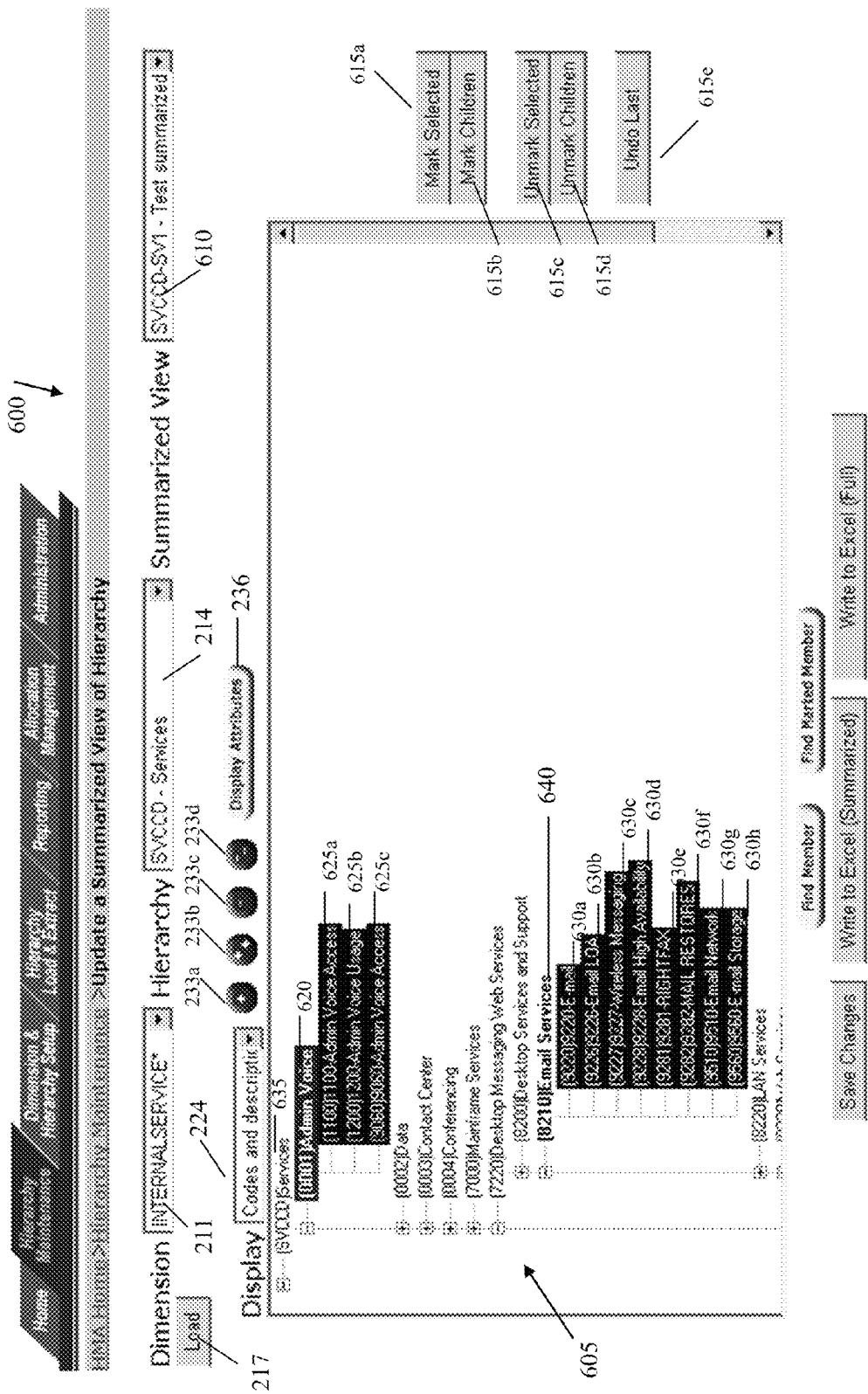
FIG. 6 is a screenshot of a user interface to define summarized views using the hierarchical reference data.

FIG. 6 illustrates a screenshot 600 of a different example of UI 155 that enables a user to define summarized views using hierarchical reference data 145. Similar to screenshot 200, screenshot 600 includes an area 605 that displays hierarchical reference data 145 and many similar controls to define the display in area 605. For example, the user chooses a dimension using pull down box 211, and as illustrated in screenshot 600, the user has selected the dimension "INTERNALSERVICE" in box 211. The user chooses a root node of display area 605 using pull down box 214. As illustrated in screenshot 600, the user has selected the root node "SVCCD" in box 214. The user clicks on "Load" button 217 and the Web browser (e.g., browser 130) displaying screenshot 600 requests a Web page containing the selected hierarchical reference data. Pull down box 224 enables the user to select how the members of the hierarchical reference data are displayed. As illustrated, because the selection made in box 224 is "Codes and descriptions", members are displayed in area 605 using member codes (e.g., 0001) and member descriptions (e.g., Admin Voice). Expansion and contraction buttons 233 enable the user to select what hierarchical levels are displayed in area 605.

The user uses box 610 to select a preexisting summary view to modify or the user can enter a name in box 610 to define a name for a new summary view. The user uses buttons 615 to mark and unmark members to make them viewable and summarized, respectively, in the summary view named in box 610. For example, the user selects member 620 (e.g., by clicking on member 620). If the user clicks on button 615a, the member 620 is marked as summarized and not viewable (e.g., marked using reverse video). The reverse video marking represents that the member is not viewable in that particular summary view, but summarized at the nearest hierarchically higher member (e.g., parent, grandparent, and the like). If the user clicks on button 615b, the children members 635a-c of member 620 are marked. If a user wants to unmark a previously marked member or its children, the user clicks on button 615c or 615d, respectively. If a user has either marked or unmarked a member or its children and then the user changes her mind before performing another action, she can click on button 615e to undo the last modification made.

A member displayed using reverse video indicates that particular member is not viewable when a report is generated. For example, the members in area 605 reference services provided by the company for which an employee may want to track costs. A report for costs is generated, for example, by matching the members displayed in area 605 with transactional data from another database in the company. In that report for costs, the viewer can view the costs corresponding to all unmarked members (i.e., all members in 605 except 620, 625a-c, and 630a-h). All costs for members that are marked (i.e., members 620, 625a-c, and 630a-h) are summarized up at the nearest hierarchically higher member (e.g., parent, grandparent, and the like). For example, because member 635 is not marked, indicating member 635 is viewable, its marked subordinate members 620 and 625a-c are rolled up and summarized at member 635. Similarly, because member 640 is not marked, indicating member 640 is viewable, its marked children members 630a-h are rolled up and summarized at member 640.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other. Servers shown as a single entity can also represent a group of servers (e.g., server farm) that has the server functionality distributed among the group of servers.

The invention has been described using particular examples. Other embodiments are within the scope of the following claims. The following are examples for illustration only and not to limit the alternatives in any way. The steps of the invention can be performed in a different order and still achieve desirable results. Also, while a few rules have been described above, the system can include a full set of rules to govern modifications to the hierarchy. Although two example screenshots are described above, the system also can generate other UIs to provide other functionality described above.

What is claimed is:

1. A method comprising:
   retrieving, from a server computing device, code to generate a web page on a client computing device, the code for the web page comprising: data representing a hierarchy stored on the server computing device, with modifications to the data being in accordance with local rules included in the code for the web page, with one or more remote rules that are stored on the server computing device, and with the one or more remote rules defining acceptable modifications to the hierarchy;
   receiving, by the client computing device, instructions for a modification to the data;
   verifying, in real-time by the client computing device, that the modification to the data complies with the local rules;

sending, from the client computing device to the server computing device, a request to determine whether the modification complies with the one or more remote rules of the hierarchy;

verifying, in real-time by the client computing device based on data received from the server computing device in response to the request, that the modification complies with the one or more remote rules that are stored on the server computing device; and causing, by the client computing device based on verifying, the server computing device to update the hierarchy with the modification.

2. The method of claim 1, further comprising performing local rule enforcement at the client computing device.

3. The method of claim 2 wherein performing local rule enforcement further comprises comparing a first data element of a first member of the hierarchy with a second data element of a second member in the hierarchy to identify a possible conflict between the first data element and the second data element.

4. The method of claim 3 wherein the possible conflict comprises the first data element being identical to the second data element.

5. The method of claim 3 wherein the first and second data elements comprise an identifier.

6. The method of claim 5 wherein the identifier comprises at least one of a member code and a member description.

7. The method of claim 1 further comprising monitoring, in real-time, the modification to the data representing the hierarchy, prior to the modification being saved as part of the hierarchy.

8. The method of claim 7 further comprising generating an audit report including information corresponding to the modification.

9. The method of claim 7 further comprising monitoring other modifications occurring at other web pages.

10. The method of claim 9, further comprising preventing the modification if the modification conflicts with the other modifications occurring at the other web pages.

11. The method of claim 1, further comprising requesting an application server rule enforcement.

12. The method of claim 1, further comprising requesting performance of a master data rule enforcement.

13. The method of claim 12 further comprising preventing the modification to the hierarchy if the modification conflicts with an entry in stored master data.

14. The method of claim 1 further comprising:
searching for a conflict; and storing the modification if no conflict is found.

15. The method of claim 1 wherein the data representing the hierarchy is a first set of data representing a first hierarchy, the method further comprising making available a second set of data representing a second hierarchy.

16. The method of claim 15 further comprising enabling a user to move a portion of the second set of data to the first set of data.

17. The method of claim 16 further comprising preventing a modification to the moved portion of the second set of data.

18. The method of claim 16 further comprising maintaining an original hierarchical relationship of the moved portion of the second set of data in the first hierarchy.

19. The method of claim 16 further comprising automatically updating the moved portion of the second set of data in the first hierarchy when there is a change to a portion of the second set of data in the second hierarchy corresponding to the moved portion of the second set of data in the first hierarchy.

20. The method of claim 1, further comprising enabling a user to establish an arrangement of a portion of the hierarchy.

21. The method of claim 20 further comprising storing the arrangement of a portion of the hierarchy.

22. The method of claim 1, wherein one of the local rules comprises a conflict check.

23. The method of claim 1, wherein one of the local rules comprises preventing the modification if a user of the client computing device does not have permission to make the modification.

24. The method of claim 23 further comprising establishing permission using an ownership attribute.

25. The method of claim 1 further comprising generating a report based on transactional data and the data representing the hierarchy.

26. The method of claim 25 wherein generating further comprises making some portions of the transactional data viewable and other portions of the transactional data summarized based on the data representing the hierarchy.

27. The method of claim 26 further comprising enabling a user to modify the data representing the hierarchy to indicate viewable and non-viewable portions.

28. The method of claim 1 further comprising notifying a subscriber of the modification.

29. The method of claim 1 wherein the hierarchy comprises a node tree.

30. A method comprising:
sending, by a server computing device to a first client computing device, code to generate a web page on the first client computing device, the code for the web page comprising:
data representing a hierarchy stored on a server computing device, with modifications to the data being in accordance with local rules included in the code for the web page, with one or more remote rules that are stored on a server computing device, and with the one or more remote rules defining acceptable modifications to the hierarchy;
receiving, from the first client computing device, a request to determine whether a modification to the data complies with the one or more remote rules of the hierarchy;
comparing, by the server computing device, the requested modification to one or more other modifications to the hierarchy that are requested by one or more second client computing devices;
verifying, in real-time by the server computing device based on comparing, that the modification complies with the one or more remote rules that are stored on the server computing device;
receiving, from the first client computing device, data specifying that the modification complies with the local rules; and
updating, by the server computing device, the hierarchy with the requested modification, with updating based on verifying and further based on receiving the data specifying that the modification complies with the local rules.

31. A system comprising
a client computing device; and
a machine-readable medium that is configured to store instructions that are executable by the client computing device to perform operations comprising:
retrieving, from a server computing device, code to generate a web page on a client computing device, the code for the web page comprising: data representing a hierarchy stored on the server computing device, with modifications to the data being in accordance with local rules included in the code for the web page, with one or more remote rules that are stored on the server computing device, and with the one or more remote rules defining acceptable modifications to the hierarchy;

receiving, by the client computing device, instructions for a modification to the data;

verifying, in real-time by the client computing device, that the modification to the data complies with the local rules;

sending, from the client computing device to the server computing device, a request to determine whether the modification complies with the one or more remote rules of the hierarchy;

verifying, in real-time by the client computing device based on data received from the server computing device in response to the request, that the modification complies with the one or more remote rules that are stored on the server computing device; and causing, by the client computing device based on verifying, the server computing device to update the hierarchy with the modification.

32. The system of claim 31, wherein the operations further comprise:

performing local rule enforcement at the client computing device.

33. The system of claim 31, wherein the operations further comprise:

monitoring, in real-time, the modification to the data representing the hierarchy, prior to the modification being saved as part of the hierarchy.

34. The system of claim 31 further comprising a storage device storing the data representing the hierarchy.

35. The system of claim 31 further comprising a database including the data representing the hierarchy.

36. The system of claim 31 further comprising a network wherein the web page is transmitted using the network.

37. A computer program product residing on a computer readable storage device configured to store instructions that are executable to cause a client computing device to perform operations comprising:

retrieving, from a server computing device, code to generate a web page on a client computing device, the code for the web page comprising: data representing a hierarchy stored on the server computing device, with modifications to the data being in accordance with local rules included in the code for the web page, with one or more remote rules that are stored on the server computing device, and with the one or more remote rules defining acceptable modifications to the hierarchy;

receiving, by the client computing device, instructions for a modification to the data;

verifying, in real-time by the client computing device, that the modification to the data complies with the local rules;

sending, from the client computing device to the server computing device, a request to determine whether the modification complies with the one or more remote rules of the hierarchy;

verifying, in real-time by the client computing device based on data received from the server computing device in response to the request, that the modification complies with the one or more remote rules that are stored on the server computing device; and causing, by the client computing device based on verifying, the server computing device to update the hierarchy with the modification.

38. The computer program product of claim 37, wherein the operations further comprise:

performing local rule enforcement at the client computing device.

39. A computer program product residing on a computer readable storage device configured to store instructions that are executable to cause a server computing device to perform operations comprising:

sending, by the server computing device to a first client computing device, code to generate a web page on the first client computing device, the code for the web page comprising:

data representing a hierarchy stored on a server computing device, with modifications to the data being in accordance with local rules included in the code for the web page, with one or more remote rules that are stored on a server computing device, and with the one or more remote rules defining acceptable modifications to the hierarchy;

receiving, from the first client computing device, a request to determine whether a modification to the data complies with the one or more remote rules of the hierarchy;

comparing, by the server computing device, the requested modification to one or more other modifications to the hierarchy that are requested by one or more second client computing devices;

verifying, in real-time by the server computing device based on comparing, that the modification complies with the one or more remote rules that are stored on the server computing device;

receiving, from the first client computing device, data specifying that the modification complies with the local rules; and updating, by the server computing device, the hierarchy with the requested modification, with updating based on verifying and further based on receiving the data specifying that the modification complies with the local rules.

40. A system comprising a server computing device; and a machine-readable medium that is configured to store instructions that are executable by the server computing device to perform operations comprising:

sending, by the server computing device to a first client computing device, code to generate a web page on the first client computing device, the code for the web page comprising:

data representing a hierarchy stored on a server computing device, with modifications to the data being in accordance with local rules included in the code for the web page, with one or more remote rules that are stored on a server computing device, and with the one or more remote rules defining acceptable modifications to the hierarchy;

receiving, from the first client computing device, a request to determine whether a modification to the data complies with the one or more remote rules of the hierarchy;

comparing, by the server computing device, the requested modification to one or more other modifications to the hierarchy that are requested by one or more second client computing devices;

verifying, in real-time by the server computing device based on comparing, that the modification complies with the one or more remote rules that are stored on the server computing device;

receiving, from the first client computing device, data specifying that the modification complies with the local rules; and updating, by the server computing device, the hierarchy with the requested modification, with updating based on verifying and further based on receiving the data specifying that the modification complies with the local rules.

* * * * *

UNITED STATES PATENT AND TRADEMARK OFFICE
CERTIFICATE OF CORRECTION

| | | |
|---|---|---|
| PATENT NO. | : 8,522,345 B2 | Page 1 of 1 |
| APPLICATION NO. | : 12/917430 | |
| DATED | : August 27, 2013 | |
| INVENTOR(S) | : Dinesh Sharma | |

It is certified that error appears in the above-identified patent and that said Letters Patent is hereby corrected as shown below:

Title Page 2, Item (56), (Other Publications), line 10, delete "10/681,496." and insert --10/681,496, as retrieved from PAIR on May 13, 2011.--

Signed and Sealed this
Third Day of December, 2013

Margaret A. Focarino
*Commissioner for Patents of the United States Patent and Trademark Office*